(12) United States Patent
Ebert et al.

(10) Patent No.: US 10,737,439 B2
(45) Date of Patent: Aug. 11, 2020

(54) STEREOLITHOGRAPHY DEVICE HAVING A HEATING UNIT

(71) Applicants: Ivoclar Vivadent AG, Schaan (LI); Technische Universität Wien, Vienna (AT)

(72) Inventors: Jörg Ebert, Buchs (CH); Robert Gmeiner, Vienna (AT)

(73) Assignees: Ivoclar Vivadent AG, Schaan (LI); Technische Universität Wien, Vienna (AT)

( * ) Notice: Subject to any disclaimer, the term of this patent is extended or adjusted under 35 U.S.C. 154(b) by 413 days.

(21) Appl. No.: 15/523,831

(22) PCT Filed: Oct. 15, 2015

(86) PCT No.: PCT/EP2015/073924
§ 371 (c)(1),
(2) Date: May 2, 2017

(87) PCT Pub. No.: WO2016/078838
PCT Pub. Date: May 26, 2016

(65) Prior Publication Data
US 2017/0334129 A1    Nov. 23, 2017

(30) Foreign Application Priority Data

Nov. 19, 2014 (EP) .................................. 14193953

(51) Int. Cl.
*B29C 64/124* (2017.01)
*B29C 64/20* (2017.01)
(Continued)

(52) U.S. Cl.
CPC ............ *B29C 64/124* (2017.08); *B29C 64/20* (2017.08); *B29C 64/205* (2017.08); *B29C 64/295* (2017.08); *B33Y 30/00* (2014.12)

(58) Field of Classification Search
CPC ..... B29C 64/295; B29C 64/124; B29C 64/20; B22F 3/1055; B22F 2003/1056;
(Continued)

(56) References Cited

U.S. PATENT DOCUMENTS 2,877,329 A   3/1929 Gaiser
2,557,905 A   9/1946 Bruton et al.
(Continued)

OTHER PUBLICATIONS

International Preliminary Report on Patentability of PCT/EP2015/073924, dated May 23, 2017, 6 pages.

*Primary Examiner* — Philip C Tucker
*Assistant Examiner* — Jimmy R Smith, Jr.
(74) *Attorney, Agent, or Firm* — Ann M. Knab; Thad McMurray (57) ABSTRACT

A stereolithography device having a trough (2) for accommodating free-flowing, photopolymerizable material, a construction platform (4) suspended above the trough bottom on a lifting unit (6), and having a heating unit for heating the photopolymerizable material in the trough. The heating unit has a transparent, electrically conductive layer (33), which covers the entire area of at least the exposure region above the trough bottom, and which is provided outside the exposure region on opposing sides of the layer with electrical contacts (20) extended over the opposing sides, which are connected to a controlled electrical supplier to enable heating of the entire area of photopolymerizable material above the trough bottom in the exposure region by current flow through the layer.

12 Claims, 5 Drawing Sheets

(51) Int. Cl.
*B29C 64/295* (2017.01)
*B33Y 30/00* (2015.01)
*B29C 64/205* (2017.01)

(58) Field of Classification Search
CPC ...... B22F 2003/1057; B22F 2003/1058; B22F 2003/1059
See application file for complete search history.

(56) References Cited

U.S. PATENT DOCUMENTS

| | | | |
|---|---|---|---|
| 2,507,036 A | 8/1948 | McCrumm et al. | |
| 5,545,367 A * | 8/1996 | Bae | B33Y 50/02 264/401 |
| 9,067,359 B2 | 6/2015 | Rohner et al. | |
| 2012/0133083 A1 * | 5/2012 | Zenere | B29C 64/386 264/401 |
| 2016/0288412 A1 | 10/2016 | Stampfl et al. | |

* cited by examiner

STEREOLITHOGRAPHY DEVICE HAVING A HEATING UNIT

CROSS-REFERENCE TO RELATED APPLICATIONS

This application is a National Stage application of International patent application PCT/EP2015/073924 filed on Oct. 23, 2015, which claims priority to European patent application No. 14193953.8 filed on Nov. 19, 2014, the disclosures of which are incorporated herein by reference in their entirety.

The present invention relates to a stereolithography device having a trough for accommodating free-flowing, photopolymerizable material, said trough having a transparent trough bottom at least in an exposure region provided for exposures, an exposure unit arranged under the trough for exposing a surface having a contour, which is specified for the respective layer to be formed, within the exposure region, a construction platform suspended over the trough bottom on a lifting unit, on which the first layer cured by exposure is to be formed suspended thereon, a control unit, which is configured to cause successive exposures each having predefined contour by the exposure unit and to adapt the position of the construction platform above the trough bottom successively in each case after the exposure of a further layer, and having a heating unit for heating the photopolymerizable material in the trough.

A stereolithography device is known, for example, from WO 2010/045950 A1, which relates in particular to the build-up of dental restorations from liquid, photopolymerizable materials. In the known stereolithography device, a construction platform is mounted so it is vertically movable above a trough bottom, which is implemented as light-transmissive. An exposure unit is located below the trough bottom. The construction platform firstly lowered into the trough, in which the free-flowing, photopolymerizable material is filled, enough that only a layer having the desired layer thickness made of photopolymerizable material remains between the construction platform and the trough bottom. Subsequently, this layer having a predefined contour is exposed in an exposure region by the exposure unit and thus cured. After the construction platform is raised, photopolymerizable material is reintroduced into the exposure region below the construction platform, which can be performed by any type of distribution device, for example, by a squeegee blade, which is moved at a defined distance above the trough bottom in relation thereto, in order to push photopolymerizable material into the exposure region and smooth it down therein. The subsequent definition of the layer thickness is performed as described by lowering the construction platform into the reintroduced photopolymerizable material, wherein excess photopolymerizable material is displaced from the intermediate space between the underside of the last-formed layer in the trough bottom. During this generative layer-by-layer manufacturing of the molded body, layers each having predefined contour, which are stored in the control unit, are successively exposed and cured, until a molded body having the desired shape is produced by the successive curing of layers each having predefined contour.

The exposure unit has, for example, a light source, which orients light onto an imaging unit, which is formed, for example, by a matrix of micromirrors, which are selectively activatable by the control unit, so that each image element in the exposure region can be selectively exposed by corresponding control of the associated micromirror. If all micromirrors are activated, the entire exposure region is exposed. Alternatively, the light of a light source can be directed onto a so-called "digital light valve", for example, an LCD matrix, wherein the individual image elements of the LCD matrix are individually activated to enable or block the passage of light individually for each image element. The exposure intensity of each image element can also be controlled by opening and closing the individual image elements in intervals, for example, by pulse width modulation.

The bottom of the trough for receiving the free-flowing, photopolymerizable material is implemented as transparent at least in the exposure region, for example, by a glass pane. Transparent in the meaning of the present application means that the trough bottom lets the majority of electromagnetic radiation pass in the wavelength region relevant for the exposure operation; however, a certain attenuation of the intensity of the electromagnetic radiation can certainly occur in this case, if this attenuation is taken into consideration in the selection of the exposure intensity and exposure duration, so that the attenuation is compensated for and the most uniform possible curing of the respective defined layer made of photopolymerizable material is caused.

The definition of the layer thickness by lowering the construction platform, so that the underside of the last-formed layer is immersed in the reintroduced photopolymerizable material, and setting the distance of the underside of the last-formed layer to the trough bottom enables very precise setting of the layer thickness of the next layer to be cured. Layer thicknesses are typically in the range of 10 μm to 100 μm, depending on the application. The advantage of the precise setting ability of the layer thicknesses predominates over the disadvantages of the necessity, which accompanies this, of having to arrange the exposure unit under the construction platform below the trough bottom.

In many applications, the photopolymerizable materials have a high viscosity, which is the case in particular if photopolymerizable materials filled with ceramic powder, so-called slurries, are used as construction materials, which is of interest in particular in the production of dental restorations. An increased viscosity of the photopolymerizable materials can make it more difficult to reintroduce material replenishment into the exposure region, since the flowability decreases with growing viscosity of the material. Furthermore, the lowering of the construction platform having the last-formed layers thereon can require a large amount of force for defining the layer thickness of the next layer, since excess photopolymerizable material must be displaced from the intermediate space.

In this context, it is known that the fluidity of viscous photopolymerizable materials can be improved by heating. It is proposed in U.S. Pat. No. 5,545,367 B1, which describes a stereolithography device according to the preamble of claim 1, that the trough be provided with a heating unit to improve the fluidity of the photopolymerizable material located in the trough. For this purpose, it is proposed that the trough be sheathed with a heating unit, that heating coils be immersed in the photopolymerizable material, that infrared lamps or microwave radiators be directed onto the material in the trough, or that the trough as a whole be placed in a furnace.

In the case of stereolithography devices such as the present one, in which the exposure takes place from below through a transparent trough bottom, one difficulty is that the heating unit cannot interfere with the exposure in the exposure region, i.e., the heating unit can actually only act on the photopolymerizable material outside the exposure region, since otherwise the exposure would be interfered with in the exposure region below the construction platform. Indirect heating, which is performed by heat conduction and transport of the heated material into the exposure region, is not very effective, however, and does not enable a defined settable temperature of the photopolymerizable material in the exposure region.

It is the object of the present invention to implement a stereolithography device having exposure through the trough bottom and having a heating unit so that effective and uniform heating of the photopolymerizable material in the exposure region is possible.

The stereolithography device having the features of Patent claim 1 is used to achieve this object. Advantageous embodiments of the invention are specified in the dependent claims.

It is provided according to the invention that the heating unit has an electrically conductive and transparent layer, which is arranged above the trough bottom and covers at least the complete area of the exposure region, and which is provided outside the exposure region on opposing sides of the layer with electrical contacts which are extended above the opposing sides. The electrical contacts are connected to a controlled electrical supplier, so that heating over the entire area of the photopolymerizable material in the exposure region is possible by way of current flow through the entire layer. The electrically conductive transparent layer preferably has a homogeneous layer thickness to ensure a homogeneous distribution of the heating power.

Due to the heating over the entire area of the photopolymerizable material in the exposure region, where the heating unit acts on the material of the layer to be implemented next, very effective heating of the photopolymerizable material is achieved precisely in the region where the processing of the material takes place, without the exposure being interfered with in this case. The transparency of the conductive layer means here, as in the case of the trough bottom, again not necessarily, that no attenuation at all of the electromagnetic radiation used for the exposure takes place in the layer. A certain attenuation can definitely be provided if it is taken into consideration in the setting of exposure intensity and exposure duration. Fundamentally, the transparency can even vary as a function of the location in the exposure region, wherein this must be taken into consideration for compensation by a location-dependent setting of the intensity of the exposure.

The electrical contacting is performed on two opposing edge sides by opposing contacts which overlap these edge sides. Two opposing edge strips of a layer, which is square or rectangular when viewed from above, for example, can each be covered by a thin conductive strip made of copper, to which an electrical line of a power circuit leads in each case, in which an electrical supplier is also provided. The thin opposing copper strips can therefore rest directly and flatly on the electrically conductive layer at the opposing edge regions, to supply it homogeneously with electrical energy on its entire width.

In particular, by way of the heating of the photopolymerizable material in the exposure region and the reduction accompanying this of the viscosity of the material, the construction platform can be lowered with the underside of the last layer formed thereon into the material, in order to be able to define the desired layer thickness of the photopolymerizable material, without the displacement, which occurs in this case, of material from the intermediate space between the underside of the last selected layer and the trough bottom requiring excessively large force. The advantageous layer thickness definition by lowering the construction platform toward the photopolymerizable material can thus also be carried out in the case of viscous materials, without having to exert excessively large forces, which are difficult to handle, on the construction platform and the layers already formed thereon, in order to displace material from the intermediate space during the layer definition by lowering.

In a preferred embodiment, the electrically conductive transparent layer is applied to a transparent plastic film as a carrier film, which is in turn arranged above the trough bottom. In this case, the plastic carrier film can be arranged with the electrically conductive layer so that the plastic carrier film faces toward the trough bottom and the electrical layer faces away therefrom or, vice versa, the transparent plastic carrier film lies above the electrically conductive layer, which then faces toward the trough bottom.

In an alternative embodiment, a plastic carrier film assumes the function of the trough bottom, i.e., the trough is open on the bottom in the exposure region and this opening is closed by a plastic carrier film forming the trough bottom, which in turn carries the electrically conductive layer and possibly further layers such as a silicone layer and a plastic protective film on top.

The electrically conductive transparent layer can be arranged in a composite of multiple layers above the trough bottom. For example, firstly a transparent silicone layer can be applied above the trough bottom, above which the electrically conductive layer lies, which is in turn covered by a transparent plastic protective film.

Alternatively, the electrically conductive layer can first lie above the trough bottom, above which a transparent silicone layer then lies, which is in turn covered by a plastic protective film arranged above it. The electrically conductive layers can also be applied to a transparent plastic carrier film and can be located in this form in the mentioned layer composite arrangements in these cases.

In both cases, the silicone layer is used for the purpose of absorbing the tensions acting on the layer sequence, which can occur during the raising of the construction platform having the last layer cured thereon if the underside of the last implemented layer adheres to a certain extent on the uppermost layer on the trough bottom. In the event of forces on the layer sequence on the trough bottom, which can occur as the last-formed layer is pulled upward by the lifting unit, the silicone layer can elastically deform to a certain extent and thus enable a certain elastic deformation of the layer sequence on the trough bottom, which reduces tensions in the layer sequence on the trough bottom.

In a preferred embodiment, a temperature sensor is arranged on the electrically conductive coating in heat conductive contact therewith. The temperature sensor is connected to a controller, which is configured for the purpose of acting on the electrical supplier and regulating the current flow through the electrically conductive coating so that a desired input temperature or a desired chronological temperature curve is caused in the region of the electrically conductive layer over the trough bottom. The temperature sensor is preferably located at the outer edge of the exposure region or outside thereof in this case, so that the temperature sensor and the associated line connections do not interfere with the exposure operation. The controller can be, for example, a PI controller (proportional integral controller) or a PID controller (proportional integral derivative controller).

All transparent plastics come into consideration as materials for a plastic carrier film for the electrically conductive layer, i.e., for example, polyethylene (PE), polypropylene (PP), polytetrafluoroethylene (PTFE), or polyfluoroethylene propylene (FEP—a copolymer based on tetrafluoroethylene and hexafluoropropylene).

In addition to the transparency, the additional requirement is placed on the plastic protective film for covering the layer sequence on the trough bottom that the polymerized construction material should, after curing, adhere as little as possible to the plastic protective film. In this regard, in particular the above-mentioned plastics polytetrafluoroethylene (PTFE) and polyfluoroethylene propylene (FEP) are particularly suitable.

In a preferred embodiment, the material of the electrically conductive layer has indium tin oxide (ITO), tin oxide doped with fluorine (SnO2:F), tin oxide doped with aluminum (ZnO2:Al), aluminum zinc oxide (AZO), tin oxide doped with antimony (SnO2:Sb), graphene or other electrically conductive carbon compounds or electrically conductive polymers or other suitable metallic materials.

The electrically conductive transparent layer is preferably implemented so that it forms a sheet resistance and this is in the range of 1-1000 $\Omega/\square$.

The sheet resistance describes the electrical resistance of an electrically conductive layer of a sufficiently small thickness that electric current only flows through it in parallel to the layer, i.e., the current enters at one end side and exits again at the opposing edge side. The sheet resistance of a layer of the thickness d having an isotropic resistance $\rho$ is $\rho/d$. I.e., the thinner the layer, the higher its sheet resistance (in the case of constant specific resistance $\rho$. The sheet resistance thus has the same unit $\Omega$ as an ohmic resistance. To identify a dimension as a sheet resistance, however, a symbol is added for illustration, which is to indicate "per unit of square area", specifically /$\square$. In English, the unit abbreviation $\Omega$/sq is also used, wherein "sq" stands as an abbreviation for "square".

In conjunction with the present invention, layers having a thickness of approximately 1 nm to several hundred nanometers can be used. For example, a film coated with an indium tin oxide layer (having a thickness of the indium tin oxide layer of 100 nm) can be used, which has a sheet resistance of 50$\Omega$/$\square$. It can be operated with a typical power density of up to 750 W/m$^2$. In experiments under laboratory conditions, temperatures of 40° C. to 100° C. were able to be implemented therewith in the photopolymerizable material in the exposure region.

The electrically conductive, transparent layer is to cover at least the exposure region, to be able to ensure an increased temperature therein. The electrically conductive, transparent layer can preferably also extend beyond the exposure region, however, in particular cover essentially the entire trough bottom. The material outside the exposure region can thus already be heated, so that the reintroduction of photopolymerizable material therefrom into the exposure region can be carried out more easily after the construction platform is raised.

The invention will be explained hereafter on the basis of exemplary embodiments in conjunction with the drawings, in which.

Figure 1:
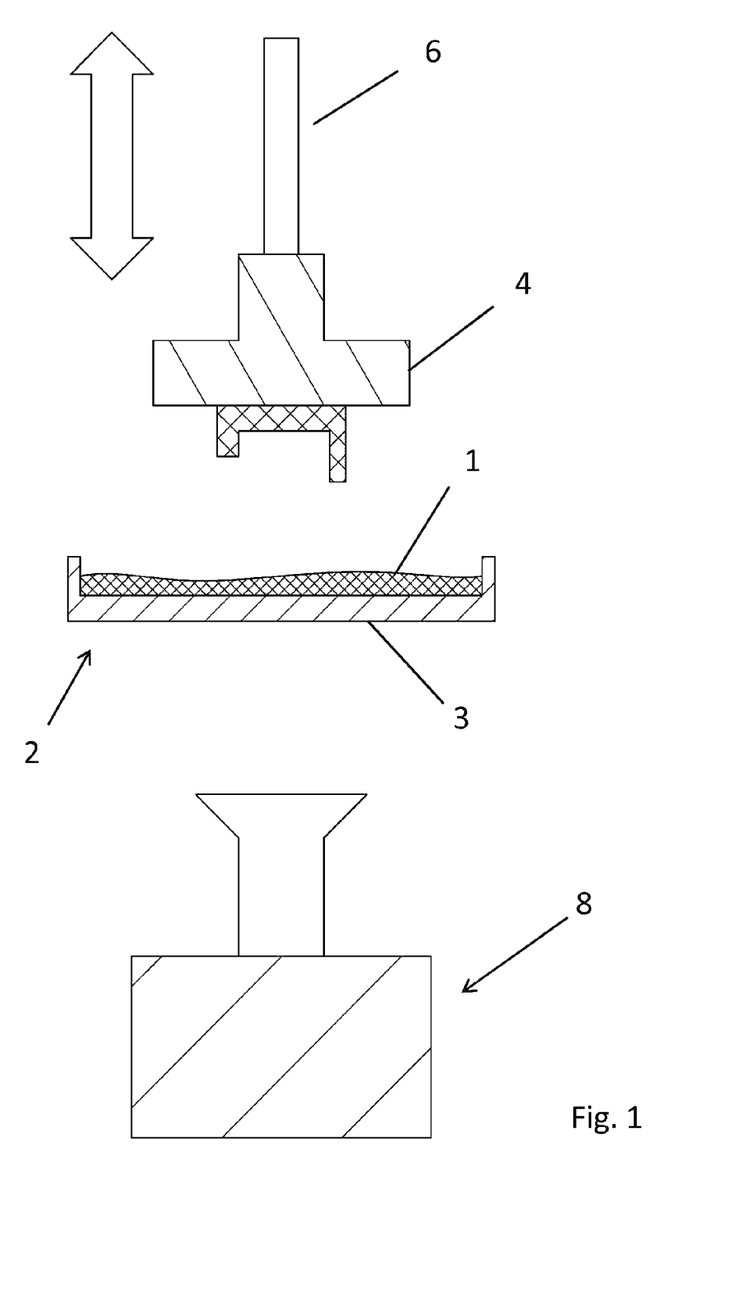
FIG. 1 shows a schematic illustration of components of a stereolithography device according to the invention.

FIG. 1 schematically shows individual components of a stereolithography device (however, without carrier and housing parts). The stereolithography device has a trough 2 having transparent trough bottom 3, into which free-flowing photopolymerizable material 1 is poured. In the photopolymerizable material 1 (during the buildup of the first layer on a construction platform 4), this construction platform 4 is lowered into the photopolymerizable material 1 until the underside of the construction platform 4 is located at a predefined distance to the trough bottom, so that just the desired layer thickness of photopolymerizable material remains between the construction platform and the trough bottom. After curing of the first layer on the construction platform 4, it is raised, photopolymerizable material is reintroduced from the outside into the exposure region (if the photopolymerizable material is not sufficiently liquid to flow by itself into the exposure region, a squeegee blade movable in relation to the trough bottom can be used to push photopolymerizable material into the exposure region). The construction platform 4 having the layer already formed thereon is subsequently lowered into the photopolymerizable material 1 until the underside of the last-formed layer has the distance to the trough bottom which is equal to the desired layer thickness for the layer, which is to be cured next, made of photopolymerizable material. These steps are successively repeated with formation of successive layers, each having predefined contour, until the sequence of the layers results in the desired molded body.

For the controlled raising and lowering of the construction platform 4, it is suspended on a controllable lifting unit 6.

An exposure unit 8 is arranged below the trough 2, which is oriented from below on an exposure region on the trough bottom 3. The exposure unit 8 is implemented for the purpose of generating a desired pattern of individually activated image elements in the exposure region under the control of a control unit, wherein the shape of the layer to be cured results from the exposed image elements. The exposure unit 8 can have, for example, a light source and a field having a large number of micromirrors, which are individually pivotable by a control unit to either expose or not expose the associated image element in the exposure region. In addition, the intensity of the exposed image elements can also be controlled in a location-dependent manner as desired by turning the individual micromirrors on and off.

The trough bottom 3 is implemented as transparent at least in the exposure region, for example, by a thin glass pane. The term transparent for the trough bottom and for the electrically conductive layer to be described in greater detail hereafter means that they are light-transmissive to a certain extent, nearly complete light transmissivity does not have to be provided for this purpose. Any possible attenuation of the electromagnetic waves used for the exposure in the material of the trough bottom or the electrically conductive layer can be taken into consideration beforehand by increasing the illumination intensity or the illumination duration accordingly.

Figure 2:
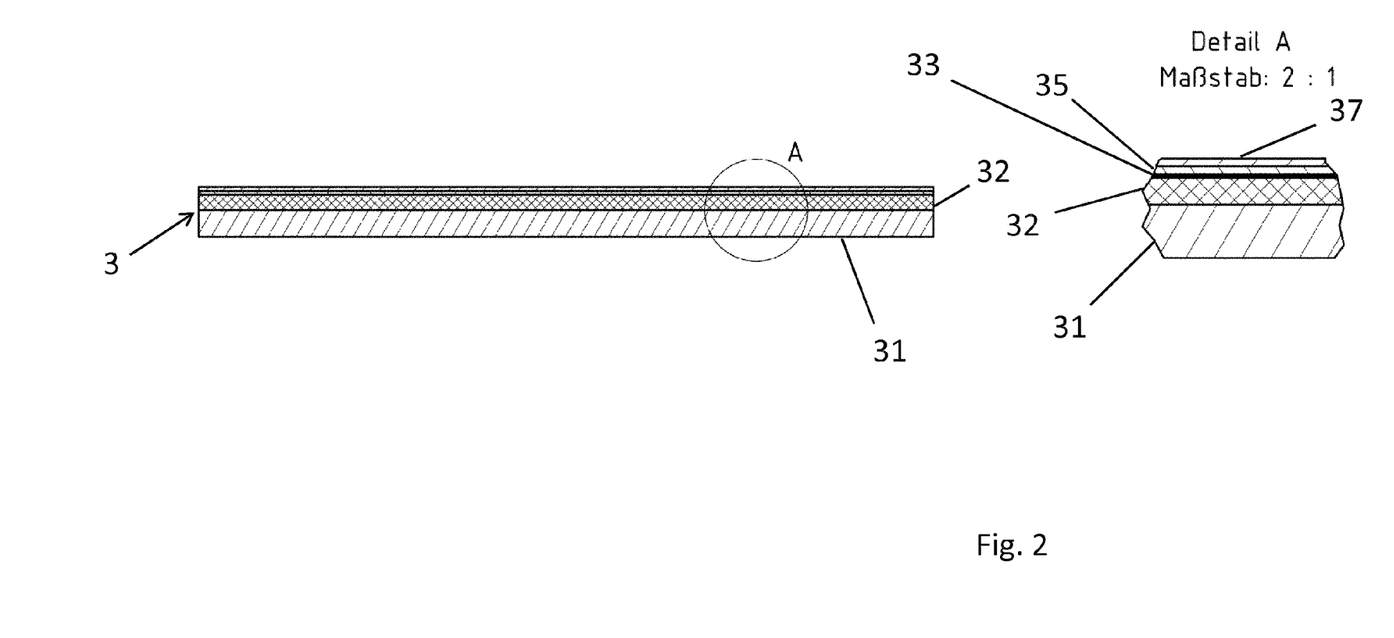
FIG. 2 shows a cross-sectional view through a trough bottom of a stereolithography device according to a first embodiment together with an enlarged detail view.

FIG. 2 shows a schematic cross-sectional view through a trough bottom 3 and a heating unit applied thereon in the exposure region and also an enlarged detail view from the cross section. The trough bottom has a glass plate 31, on which a transparent silicone layer 32 is applied. A plastic carrier film 35 is laid on the silicone layer 32, which has an electrically conductive, transparent coating 33 on its underside. The plastic carrier film 35 can be, for example, a film made of polypropylene, polytetrafluoroethylene, polyfluoroethylene propylene, or polyethylene. The electrically conductive transparent coating can consist, for example, of indium tin oxide. A transparent plastic protective film 37 is in turn applied to the transparent plastic carrier film 35. However, such a transparent plastic protective film 37 can also be omitted in the present exemplary embodiment, since the electrically conductive, transparent layer 33 is already covered and protected by its plastic carrier film 35.

It is to be noted that the cross-sectional views as in FIG. 2 are only schematic and are not to scale, i.e., the relative layer thicknesses are not to be realistically shown thereby. Furthermore, the transparent, electrically conductive layer 33, which is shown as relatively thin, is illustrated by a black line for reasons of illustration, which is only to make it better visible and is meant solely symbolically. In fact, all layers in the layer composite should be transparent.

Figure 3:
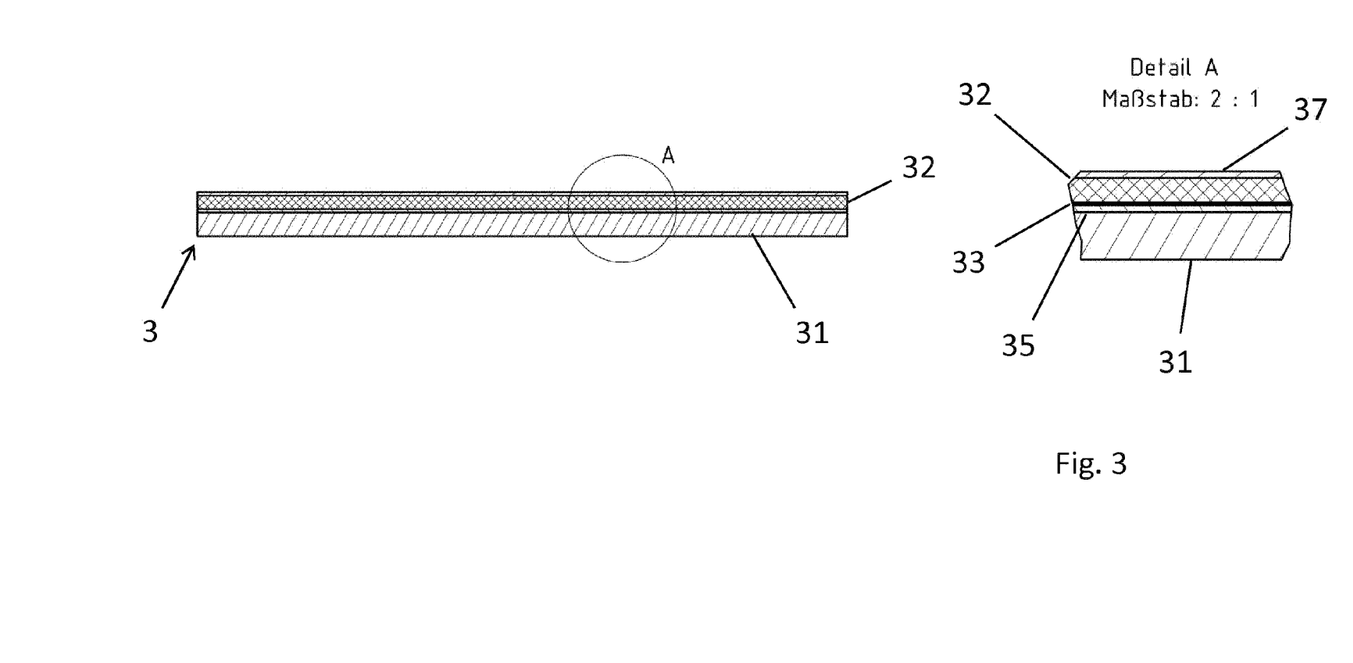
FIG. 3 shows a cross-sectional view through a trough bottom of a stereolithography device according to a second embodiment together with an enlarged detail view.

FIG. 3 shows a cross section of a second exemplary embodiment corresponding to FIG. 2, which differs from that from FIG. 2 in that the transparent silicone layer 32 and the transparent plastic carrier film 35 having the electrically conductive, transparent layer 33 on their underside have exchanged their positions, i.e., the plastic carrier film 35 lies with the electrically conductive, transparent layer 33 directly on the transparent trough bottom 31.

Figure 4:
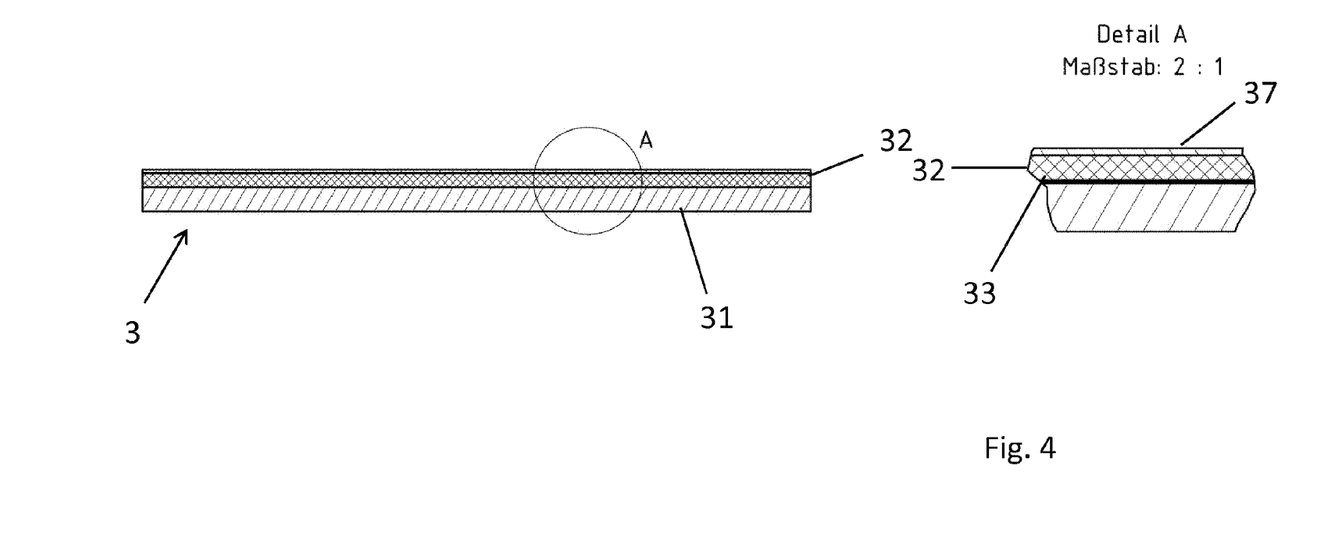
FIG. 4 shows a cross-sectional view through a trough bottom of a stereolithography device according to a third exemplary embodiment together with an enlarged detail view.

FIG. 4 shows a cross-sectional view of a third exemplary embodiment, corresponding to the two preceding exemplary embodiments in FIGS. 1 and 2, which differs from the second exemplary embodiment in FIG. 3 in that the electrically conductive transparent layer 33 is not applied to a plastic carrier film 35 as in FIG. 3, but rather the electrically conductive, transparent layer 33 is applied directly to the transparent glass plate 31, and the transparent silicone layer 32 directly follows the electrically conductive, transparent layer 33, and the transparent plastic protective film 37 follows thereon.

Figure 5:
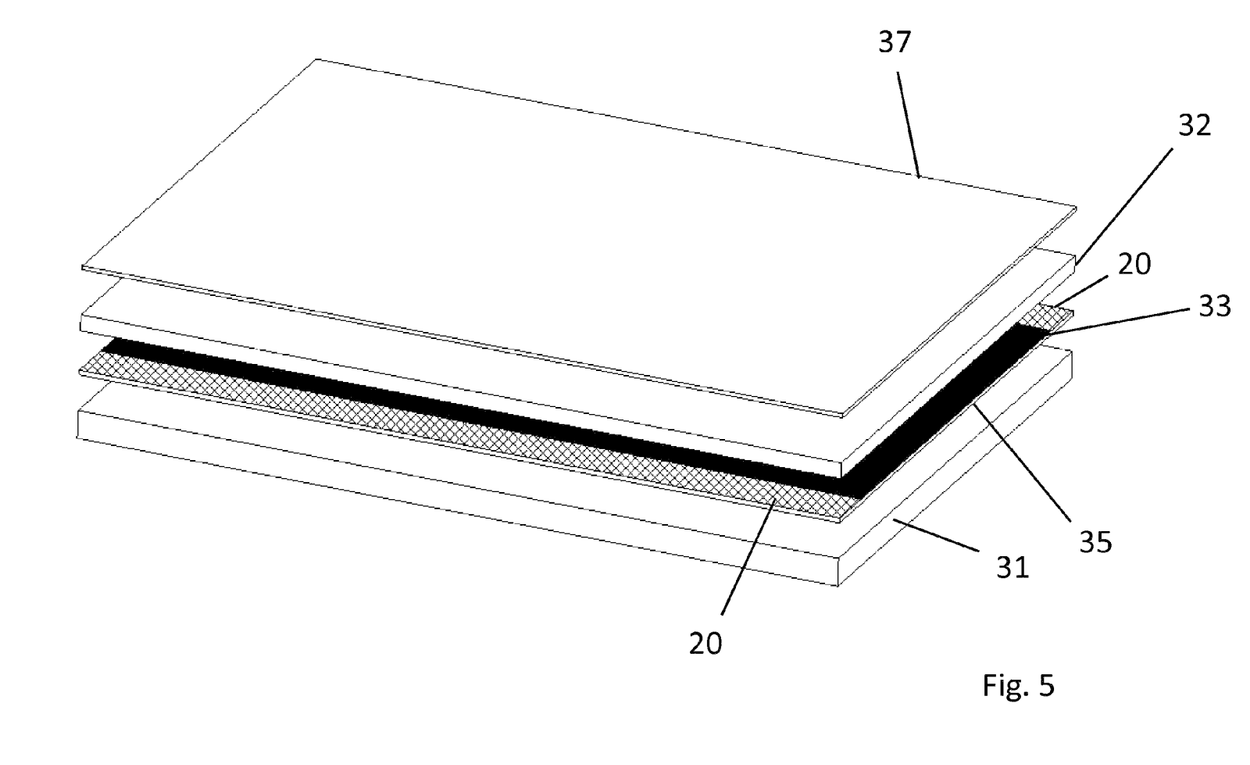
FIG. 5 shows an exploded view of the trough bottom from FIG. 3.

FIG. 5 shows the structure of the trough bottom having heating unit of the second exemplary embodiment in an exploded view, i.e., the transparent trough bottom and the layers following thereon are lifted off of one another. In FIG. 5, the electrical contacting of the electrically conductive, transparent layer 33 is shown. This is performed by two opposing strips 20 of a thin metallic conductor, wherein these band-shaped metallic conductor strips lie directly on the opposing edge strips of the electrically conductive, transparent layer 33. Each of the two metal strips 20 is connected to an electrical line, which, together with an electrical supplier having controller (not shown), form a power circuit, to generate a desired heating power by way of controlled current flow through the electrically conductive, transparent layer 33.

To control the electrical power to be supplied by the electrical supplier, a temperature sensor can be arranged on the electrically conductive, transparent layer 33 in heat conductive contact with the electrically conductive, transparent layer 33, to detect its temperature. The temperature sensor is provided with a controller, which is in turn connected to the controllable electrical supplier in order to control its power, so that a desired temperature is set on the electrically conductive, transparent layer 33.

The invention claimed is:

1. A stereolithography device comprising
a trough for accommodating free-flowing, photopolymerizable material, said trough having a transparent trough bottom at least in an exposure region provided for exposures,
an exposure unit, which is arranged below the trough, for exposing a surface having a predefined contour for each layer and each successive layer to be formed inside the exposure region,
a construction platform suspended above the trough bottom on a lifting unit, on which a first layer cured by exposure is to be formed suspended thereon wherein a position of the construction platform above the trough bottom is adapted successively after each exposure of a layer to be formed, and,
a heating unit for heating the photopolymerizable material in the trough,
wherein the heating unit has a transparent, electrically conductive layer, which covers at least an entire area of the exposure region above the trough bottom, and which is provided with electrical contacts outside the exposure region and extending over opposing sides of the transparent, electrically conductive layer, with the electrical contacts connected to a controlled electrical supplier to enable heating of an entire area of the photopolymerizable material above the trough bottom in the exposure region by current flow through the transparent, electrically conductive layer.

2. The stereolithography device according to claim 1 wherein the transparent, electrically conductive layer is applied to a transparent plastic carrier film, which is in turn arranged above the trough bottom.

3. The stereolithography device according to claim 2, wherein the transparent plastic carrier film for the transparent, electrically conductiver layer is made of polyethylene (PE), polypropylene (PP), polytetrafluoroethylene(PTFE), or polyfluoroethylene propylene (FEP).

4. The stereolithography device according to claim 1, wherein the trough bottom in the exposure region is formed by a transparent plastic carrier film, above which the transparent, electrically conductive layer lies.

5. The stereolithography device according to claim 1, wherein firstly a transparent silicone layer is applied above the trough bottom,
the transparent, electrically conductive layer is applied above the transparent silicon layer, and
a transparent plastic protective film is applied above the transparent, electrically conductive layer.

6. The stereolithography device according to claim 1, wherein the transparent, electrically conductive layer lies above the trough bottom,
above the transparent, electrically conductive layer a transparent silicone layer is arranged, and
the transparent silicon layer is finally covered by a transparent plastic film.

7. The stereolithography device according to claim 1, wherein a temperature sensor is arranged on the transparent, electrically conductive layer in heat conductive contact therewith, this sensor being connected to a controller, which is configured to control the current flow through the transparent, electrically conductive layer so that a desired temperature or a desired chronological temperature curve is caused in the transparent, electrically conductive layer above the trough bottom.

8. The stereolithography device according to claim 5, wherein the transparent plastic protective film is made of polytetrafluoroethylene (PTFE) or polyfluoroethylene propylene (FEP).

9. The stereolithography device according to claim 1, wherein the transparent, electrically conductive layer comprises one or more of indium tin oxide (ITO), tin oxide doped with fluorine (SnO2:F), tin oxide doped with aluminum (ZnO2:Al), aluminum zinc oxide (AZO), tin oxide doped with antimony (SnO2:Sb), graphene or other electrically conductive carbon compounds, electrically conductive polymers, or another metallic compound.

10. The stereolithography device according to claim 1, wherein the transparent, electrically conductive layer has a sheet resistance in a range of 1-1000 Ω☐.

11. The stereolithography device according to claim 1, wherein electrical heating units are also provided on the trough bottom on regions outside the exposure region.

12. The stereolithography device according claim 11, wherein the transparent, electrically conductive layer extends beyond the exposure region above the trough bottom.

\* \* \* \* \*